US012525416B2

(12) United States Patent
Tomizawa et al.

(10) Patent No.: US 12,525,416 B2
(45) Date of Patent: Jan. 13, 2026

(54) CIRCUIT BREAKER

(71) Applicant: Mitsubishi Electric Corporation, Tokyo (JP)

(72) Inventors: Yusuke Tomizawa, Tokyo (JP); Takuma Sasai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 182 days.

(21) Appl. No.: 18/286,564

(22) PCT Filed: Apr. 28, 2021

(86) PCT No.: PCT/JP2021/016986

§ 371 (c)(1),
(2) Date: Oct. 12, 2023

(87) PCT Pub. No.: WO2022/230109

PCT Pub. Date: Nov. 3, 2022

(65) Prior Publication Data

US 2024/0194427 A1 Jun. 13, 2024

(51) Int. Cl.
*H01H 33/662* (2006.01)

(52) U.S. Cl.
CPC .............................. *H01H 33/66238* (2013.01)

(58) Field of Classification Search
CPC ........... H01H 33/66238; H01H 33/662; H01H 2033/66246; H01H 2033/66253; H01H 2033/6623

(Continued)

(56) References Cited

U.S. PATENT DOCUMENTS 3,950,628 A * 4/1976 Hruda .................. H01H 33/002 218/138
4,077,114 A * 3/1978 Sakuma ........... H01H 33/66207 218/135

(Continued)

FOREIGN PATENT DOCUMENTS

JP S53-157864 U 12/1978
JP H02-064132 U 5/1990

(Continued)

OTHER PUBLICATIONS

International Search Report and Written Opinion mailed on Aug. 3, 2021, received for PCT Application PCT/JP2021/016986, filed on Apr. 28, 2021, 9 pages including English Translation.

*Primary Examiner* — William A Bolton
(74) *Attorney, Agent, or Firm* — XSENSUS LLP

(57) ABSTRACT

A circuit breaker including a bellows member having a sufficient fatigue life is obtained. The circuit breaker includes a fixed electrode, a movable electrode, a container, a movable shaft, a bellows member, and a resin layer. The bellows member is disposed so as to surround a periphery of the movable shaft. The resin layer is connected to the plurality of uneven portions of the bellows member. The resin layer includes a first part, a second part, and a third part. The first part is connected to a first recess and has a first thickness. The second part is connected to a second recess and has a second thickness. The third part is connected to at least one of a plurality of intermediate recesses and has a third thickness. The third thickness is thinner than the first thickness and the second thickness.

9 Claims, 10 Drawing Sheets

(58) Field of Classification Search
USPC .................................. 218/139, 118, 138, 135
See application file for complete search history.

(56) References Cited

U.S. PATENT DOCUMENTS

| | | | | | |
|---|---|---|---|---|---|
| 4,492,837 | A * | 1/1985 | Crouch | H01H 33/66 | 218/135 |
| 4,585,913 | A * | 4/1986 | Yorita | F16J 15/52 | 218/135 |
| 6,043,446 | A * | 3/2000 | Mayo | H01H 33/66207 | 218/135 |
| 8,324,521 | B2 * | 12/2012 | Li | H01H 33/66238 | 218/135 |
| 8,497,445 | B2 * | 7/2013 | Yoshida | H01H 33/66207 | 218/118 |
| 9,422,933 | B2 * | 8/2016 | Tatsumi | F04B 45/02 | |
| 10,614,980 | B2 * | 4/2020 | Newinger | H01H 33/66207 | |
| 2013/0001200 | A1 * | 1/2013 | Morita | H01H 33/66238 | 218/135 |
| 2013/0048611 | A1 | 2/2013 | Miki | | |

FOREIGN PATENT DOCUMENTS

| | | | |
|---|---|---|---|
| JP | H06-012947 | A | 1/1994 |
| JP | 5348318 | B2 | 11/2013 |
| JP | 2020-015827 | A | 1/2020 |

* cited by examiner

CIRCUIT BREAKER

CROSS-REFERENCE TO RELATED APPLICATION

This application is based on PCT filing PCT/JP2021/016986, filed Apr. 28, 2021, the entire contents of which are incorporated herein by reference.

TECHNICAL FIELD

The present disclosure relates to a circuit breaker.

BACKGROUND ART

Conventionally, a circuit breaker including a fixed electrode and a movable electrode that are disposed inside a container and a movable shaft that drives the movable electrode is known (for example, see Japanese Utility Model Laying-Open No. 2-064132). In the conventional circuit breaker described above, a bellows member is installed so as to surround a periphery of the movable shaft. In the circuit breaker described above, a stretchable synthetic resin layer is formed on an inner peripheral surface of the bellows member such that an uneven portion of the bellows member is embedded. In the circuit breaker, when impact energy applied to the bellows member due to an opening and closing operation of the movable electrode is consumed by deformation of the synthetic resin layer, so that vibration of the bellows member is prevented.

CITATION LIST

Patent Literature

PTL 1: Japanese Utility Model Laying-Open No. 2-064132

SUMMARY OF INVENTION

Technical Problem

In the conventional circuit breaker described above, because the synthetic resin layer is formed such that the uneven portion of the bellows member is embedded, mass of the entire bellows member increases. For this reason, amplitude at an initial stage of transient vibration of the bellows member during the opening and closing operation of the movable electrode increases, and as a result, there is a risk that a fatigue life of the bellows member is shortened.

The present disclosure has been made to solve the above problems, and an object of the present disclosure is to provide a circuit breaker including a bellows member having a sufficient fatigue life.

Solution to Problem

A circuit breaker according to the present disclosure includes a fixed electrode, a movable electrode, a container, a movable shaft, a bellows member, and a resin layer. The movable electrode is movable between a first position in contact with the fixed electrode and a second position away from the fixed electrode. The container holds the fixed electrode and the movable electrode therein. The movable shaft extends from an outside to an inside of the container and is connected to the movable electrode. The movable shaft moves along an extending direction of the movable shaft to move the movable electrode between the first position and the second position. The bellows member is disposed so as to surround a periphery of the movable shaft. The bellows member includes a plurality of uneven portions. The bellows member connects the movable shaft and the container. The resin layer is connected to the plurality of uneven portions of the bellows member. The container includes a first connection portion. A first end of the bellows member is connected to the first connection portion. The movable shaft includes a second connection portion. A second end located on a side opposite to the first end of the bellows member is connected to the second connection portion. The plurality of uneven portions include a first recess, a second recess, and a plurality of intermediate recesses. The first recess is closest to the first connection portion. The second recess is closest to the second connection portion. The plurality of intermediate recesses are disposed between the first recess and the second recess. The resin layer includes a first part, a second part, and a third part. The first part is connected to the first recess and has a first thickness. The second part is connected to the second recess and has a second thickness. The third part is connected to at least one of the plurality of intermediate recesses and has a third thickness. The third thickness is thinner than the first thickness and the second thickness.

Advantageous Effects of Invention

According to the above, the circuit breaker including the bellows member having the sufficient fatigue life is obtained.

DESCRIPTION OF EMBODIMENTS

Figure 1:
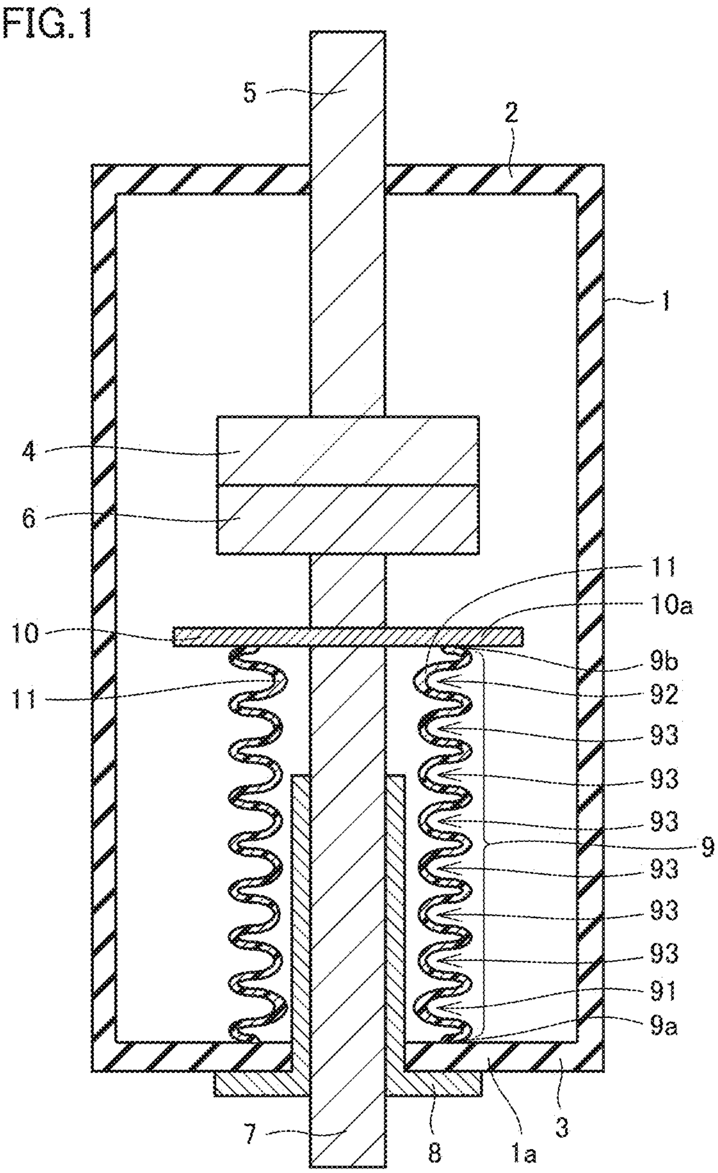
FIG. 1 is a schematic sectional view illustrating a circuit breaker according to a first embodiment.

Hereinafter, embodiments of the present disclosure will be described. The same components are denoted by the same reference numerals, and a repetitive description will be omitted.

First Embodiment

<Configuration of Circuit Breaker>

Figure 2:
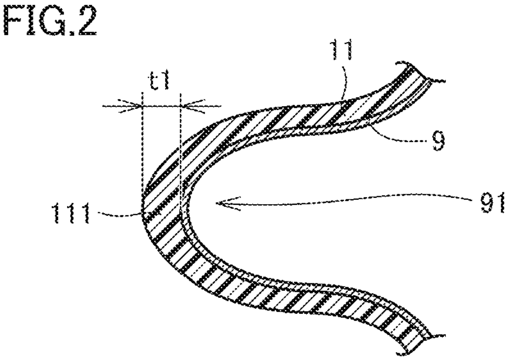
FIG. 2 is a schematic partial sectional view illustrating a bellows member in the circuit breaker of FIG. 1.
Figure 3:
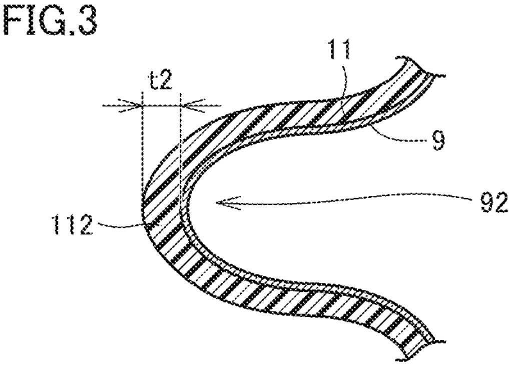
FIG. 3 is a schematic partial sectional view illustrating the bellows member in the circuit breaker of FIG. 1.
Figure 4:
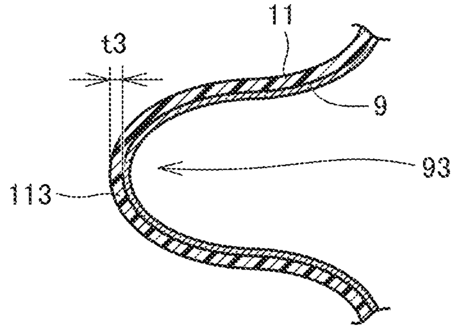
FIG. 4 is a schematic partial sectional view illustrating the bellows member in the circuit breaker of FIG. 1.

FIG. 1 is a schematic sectional view illustrating a circuit breaker according to a first embodiment. FIGS. 2 to 4 are schematic partial sectional views illustrating the bellows member in the circuit breaker of FIG. 1.

As illustrated in FIGS. 1 to 4, the circuit breaker of the first embodiment mainly includes a fixed electrode 4, a fixed shaft 5, a movable electrode 6, a container 1, a movable shaft 7, a guide member 8, a bellows member 9, and a resin layer 11. Movable electrode 6 is movable between a first position in contact with fixed electrode 4 and a second position away from fixed electrode 4.

Container 1 holds fixed electrode 4 and movable electrode 6 therein. For example, the inside of container 1 is held in a vacuum. Container 1 includes an upper flange 2 located above and a lower flange 3 disposed at a position opposite to upper flange 2. Fixed shaft 5 is fixed to upper flange 2. Fixed shaft 5 penetrates upper flange 2, and one end of fixed shaft 5 is disposed inside container 1. Fixed shaft 5 is connected to upper flange 2 so as to maintain airtightness. Fixed electrode 4 is connected to one end of fixed shaft 5.

Movable shaft 7 extends from the outside to the inside of container 1 through lower flange 3 interposed therebetween. Specifically, a through-hole is made in lower flange 3. Guide member 8 is inserted into the through-hole. Guide member 8 is fixed to lower flange 3. Guide member 8 is a cylindrical body and has a hole. A flange portion projecting outward is formed on a lower portion of guide member 8. The flange portion is in contact with a surface of lower flange 3 of container 1. Movable shaft 7 is inserted into the hole of guide member 8. An outer peripheral surface of movable shaft 7 is in slidable contact with an inner peripheral surface of the hole of guide member 8. Movable shaft 7 is disposed so as to extend from the outside to the inside of container 1 through guide member 8 interposed therebetween. Movable shaft 7 is connected to a drive mechanism (not illustrated) outside container 1. A device having an arbitrary configuration can be used as the drive mechanism, but for example, a spring type or electromagnetic type drive device may be used.

Movable electrode 6 is connected to a point of movable shaft 7. Movable electrode 6 is disposed at a position opposite to fixed electrode 4. Movable electrode 6 is disposed so as to be switchable between a state in which movable electrode 6 is in contact with fixed electrode 4 and a state in which movable electrode 6 is separated from fixed electrode 4. Movable shaft 7 moves along an extending direction of movable shaft 7 to move movable electrode 6 between the first position and the second position.

The first position of movable electrode 6 is the position of movable electrode 6 at which movable electrode 6 is in contact with fixed electrode 4. From a different point of view, the first position is the position of movable electrode 6 in a state in which movable electrode 6 moves closest to fixed electrode 4 (closed state). At this point, in the circuit breaker, fixed electrode 4 and movable electrode 6 are in a conductive state.

The second position of movable electrode 6 is a position of movable electrode 6 at which movable electrode 6 is separated from fixed electrode 4. From a different point of view, the second position is the position of the movable electrode 6 in a state in which movable electrode 6 is farthest from fixed electrode 4 (open state). At this point, in the circuit breaker, fixed electrode 4 and movable electrode 6 are electrically insulated from each other. Specifically, when the drive mechanism described above operates, movable shaft 7 moves in a direction away from fixed electrode 4 in an axial direction in a state in which movable shaft 7 is in contact with the inner peripheral surface of the hole of guide member 8. As a result, when movable electrode 6 is separated from fixed electrode 4, energization between fixed electrode 4 and movable electrode 6 is cut off. This operation is the opening operation of the circuit breaker. In this manner, movable electrode 6 moves from the first position to the second position by the opening operation of the circuit breaker.

Bellows member 9 is disposed so as to surround the periphery of movable shaft 7. Bellows member 9 includes a plurality of uneven portions. In the uneven portion of bellows member 9, a protrusion (crest portion) and a recess (valley portion) are alternately arranged. Bellows member 9 can expand and contract along the axial direction of movable shaft 7. When movable shaft 7 moves in the direction away from fixed electrode 4, the recess and the protrusion of the uneven portion approach each other, whereby bellows member 9 contracts. When movable shaft 7 moves in the direction approaching fixed electrode 4, the protrusion and the recess of the uneven portion are separated from each other, whereby bellows member 9 extends. The number of protrusions and the number of recesses in the uneven portion of bellows member 9 can be set to any number as long as they can follow expansion and contraction accompanying the movement of movable shaft 7. For example, the number of protrusions may be greater than or equal to six, and the number of recesses may be greater than or equal to five.

Bellows member 9 connects movable shaft 7 and container 1. Specifically, a first end **9*a* of bellows member 9 is connected to the inner peripheral surface of lower flange 3 of container 1. For example, bellows member 9 and container 1 are connected by welding or brazing. In container 1, a portion to which first end 9*a* of bellows member 9 is connected is a first connection portion 1*a***.

An end plate 10 is connected to movable shaft 7. End plate 10 is a flat plate-shaped member extending in the direction intersecting the extending direction of movable shaft 7. End plate 10 preferably extends in the direction orthogonal to the extending direction of movable shaft 7. The shape of end plate 10 can be any shape, and for example, is a disk shape. End plate 10 is located inside container 1. End plate 10 is disposed so as to surround the outer peripheral surface of movable shaft 7. A second end **9*b* of bellows member 9 is connected to end plate 10. Second end 9*b* is an end located on the side opposite to first end 9***a* of bellows member 9. For example, end plate 10 and bellows member 9 are connected by welding or brazing. A portion of end plate 10 to which second end 9*b* of bellows member 9 is connected is a second connection portion 10*a*. Bellows member 9 airtightly connects the inner surface of lower flange 3 and end plate 10. As a result, the space outside bellows member 9 and inside container 1 is airtightly held.

The plurality of uneven portions in bellows member 9 include a first recess 91, a second recess 92, and a plurality of intermediate recesses 93. Each of first recess 91, second recess 92, and intermediate recess 93 is a valley portion recessed toward the side of movable shaft 7 in the uneven portion. A protrusion is disposed between first recess 91, second recess 92, and the plurality of intermediate recesses 93. From a different point of view, each of first recess 91, second recess 92, and intermediate recess 93 is a portion in which a diameter of bellows member 9 is relatively small.

Each of the plurality of protrusions in bellows member 9 is a portion where the diameter of bellows member 9 is relatively large. In bellows member 9, first recess 91 is closest to first connection portion 1*a*. Second recess 92 is closest to second connection portion 10*a*. The plurality of intermediate recesses 93 are disposed between first recess 91 and second recess 92.

Resin layer 11 is connected to the inner peripheral side of the uneven portion of bellows member 9. Resin layer 11 may be connected to the outer peripheral side of the uneven portion of bellows member 9. Resin layer 11 is connected to the entire inner peripheral surface of the uneven portion of bellows member 9. Resin layer 11 may be connected to the entire outer peripheral surface of the uneven portion of bellows member 9. Any resin can be adopted as resin layer 11 as long as it is a resin that is rich in stretchability and can convert vibration energy into thermal energy by viscoelastic deformation. In addition, resin layer 11 may contain a filler that converts the vibration energy into the thermal energy by friction, such as a filler used in a damping coating material.

The thickness of resin layer 11 is locally different as described later. The details will be described below.

Resin layer 11 includes a first part 111, a second part 112, and a third part 113. First part 111 is connected to first recess 91. First part 111 has a first thickness t1. Second part 112 is connected to second recess 92. Second part 112 has a second thickness t2. Third part 113 is connected to the plurality of intermediate recesses 93. Third part 113 has a third thickness t3. Third thickness t3 is thinner than first thickness t1 and second thickness t2.

From a different point of view, the thicknesses (first thickness t1 and second thickness t2) of first part 111 and second part 112 that are located at both ends in the extending direction of bellows member 9 in resin layer 11 and connected to first recess 91 or second recess 92 are larger than the thickness (third thickness t3) of third part 113 of resin layer 11 located at a central portion in the extending direction.

For example, a lower recess group including first recess 91 and three intermediate recesses 93 and an upper recess group including second recess 92 and three intermediate recesses 93 are considered with the central portion in the extending direction of bellows member 9 as a boundary. In the lower recess group, first thickness t1 of first part 111 connected to first recess 91 of a first valley from the side of first end 9*a* is greater than third thickness t3 of third part 113 connected to three intermediate recesses 93 of a second valley to a fourth valley from the side of first end 9*a*. In the upper recess group, second thickness t2 of second part 112 connected to second recess 92 of the first valley from the side of second end 9*b* is greater than third thickness t3 of third part 113 connected to three intermediate recesses 93 of the second valley to the fourth valley from the side of second end 9*b*.

As long as the above-described thickness relationship is satisfied, thickness t3 of third part 113 connected to each of the plurality of intermediate recesses 93 may be the same or different from each other. First thickness t1 and second thickness t2 may be different or the same. In the circuit breaker of FIG. 1, the number of intermediate recesses 93 is 6, but the number of intermediate recesses 93 may be greater than or equal to 7 or less than or equal to 5.

In the circuit breaker described above, resin layer 11 is connected to all intermediate recesses 93, but third part 113 may not be connected to any one of intermediate recesses 93. For example, resin layer 11 may include first part 111 and second part 112, and resin layer 11 may not be connected to intermediate recess 93. In this case, assuming that third part 113 having third thickness t3 of zero is connected to intermediate recess 93, it can be said that the thicknesses (first thickness t1 and second thickness t2) of first part 111 and second part 112 are greater than the third thickness of third part 113. Third part 113 may be connected to at least one of the plurality of intermediate recesses 93. Also in this case, the thicknesses (first thickness t1 and second thickness t2) of first part 111 and second part 112 may be greater than third thickness t3 of third part 113 connected to one of the plurality of intermediate recesses 93.

Advantageous Effect

The circuit breaker of the first embodiment includes fixed electrode 4, movable electrode 6, container 1, movable shaft 7, bellows member 9, and resin layer 11. Movable electrode 6 is movable between a first position in contact with fixed electrode 4 and a second position away from fixed electrode 4. Container 1 holds fixed electrode 4 and movable electrode 6 therein. Movable shaft 7 extends from the outside to the inside of container 1 and is connected to movable electrode 6. Movable shaft 7 moves along an extending direction of movable shaft 7 to move movable electrode 6 between the first position and the second position. Bellows member 9 is disposed so as to surround the periphery of movable shaft 7. Bellows member 9 includes a plurality of uneven portions. Bellows member 9 connects movable shaft 7 and container 1. Resin layer 11 is connected to the plurality of uneven portions of bellows member 9. Container 1 includes first connection portion 1*a*. First end 9*a* of bellows member 9 is connected to first connection portion 1*a*. Movable shaft 7 includes second connection portion 10*a*. Second end 9*b* located on the opposite side of first end 9*a* of bellows member 9 is connected to second connection portion 10*a*. The plurality of uneven portions include first recess 91, second recess 92, and the plurality of intermediate recesses 93. First recess 91 is closest to first connection portion 1*a*. Second recess 92 is closest to second connection portion 10*a*. The plurality of intermediate recesses 93 are disposed between first recess 91 and second recess 92. Resin layer 11 includes a first part 111, a second part 112, and a third part 113. First part 111 is connected to first recess 91 and has first thickness t1. Second part 112 is connected to second recess 92 and has second thickness t2. Third portion 113 is connected to at least one of the plurality of intermediate recesses 93 and has third thickness t3. Third thickness t3 is thinner than first thickness t1 and second thickness t2.

In this way, an increase in the mass of the entire assembly (bellows portion) of bellows member 9 and resin layer 11 can be prevented as compared with the case where entire resin layer 11 has a uniform thickness. Here, when a natural frequency of bellows member 9 decreases, the amplitude of the transient vibration generated in bellows member 9 increases. As the mass of bellows member 9 increases, the natural frequency decreases. Thus, when the increase in the mass of the entire bellows portion as described above, the increase in the initial amplitude in the transient vibration of bellows member 9 can be prevented during the operation of the circuit breaker.

Furthermore, the thickness of resin layer 11 (first thickness t1 and second thickness t2) is made sufficiently thick in first recess 91 and second recess 92 that are the first recess from first end 9*a* that is the connection portion between bellows member 9 and container 1 or second end 9*b* that is the connection portion between bellows member 9 and movable shaft 7, whereby the transient vibration of bellows member 9 can be effectively attenuated.

At this point, the transient vibration generated in bellows member 9 is a compressional wave of displacement transmitted in the extending direction of bellows member 9. The distortion of bellows member 9 due to the compressional wave becomes maximum in the vicinity of first end 9*a* and second end 9*b* that are both ends of bellows member 9. Furthermore, due to the structure of bellows member 9, the amount of strain generated in the recess tends to be greater than the amount of strain generated in the protrusion. For this reason, the amount of strain generated in first recess 91 and second recess 92 that are the recess of the first valley from both ends of bellows member 9 tends to be the greatest.

Therefore, the deformation amount of first part 111 and second part 112 of resin layer 11 connected to first recess 91 and second recess 92 is the greatest. Because the thicknesses (first thickness t1 and second thickness t2) of first part 111 and second part 112 are made relatively thick, the vibration energy can be sufficiently converted into the thermal energy in first part 111 and second part 112. As a result, the transient vibration of bellows member 9 can be effectively attenuated as described above.

As described above, in the circuit breaker described above, when third thickness t3 of third part 113 of resin layer 11 connected to intermediate recess 93 is thinned, the transient vibration at an early stage can be attenuated by the deformation of first part 111 and second part 112 of resin layer 11 connected to first recess 91 and second recess 92 that are the first valley from the end while the increase in the amplitude of the transient vibration of the bellows portion is prevented. Thus, a fatigue life of bellows member 9 can be extended.

In the circuit breaker, third part 113 may be connected to all of the plurality of intermediate recesses 93. In this case, resin layer 11 is disposed on entire bellows member 9, so that the transient vibration of bellows member 9 can be more effectively attenuated.

Second Embodiment

<Configuration of Circuit Breaker>

Figure 5:
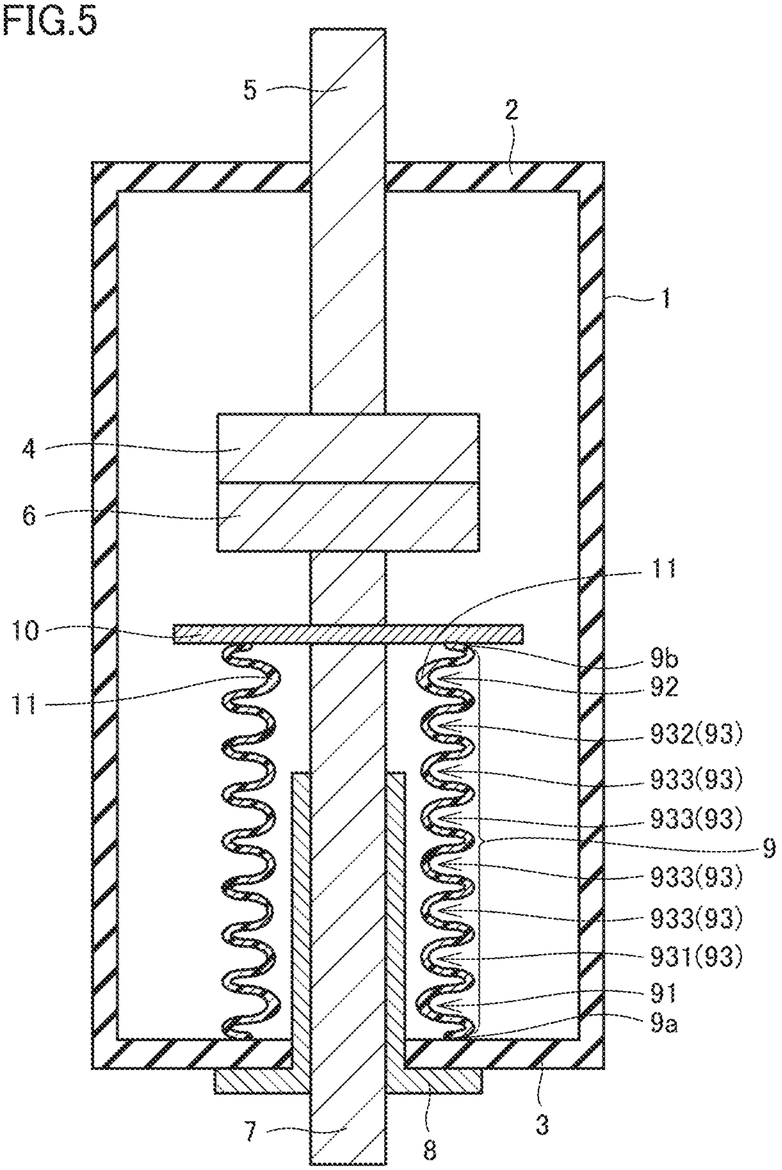
FIG. 5 is a schematic sectional view illustrating a circuit breaker according to a second embodiment.
Figure 6:
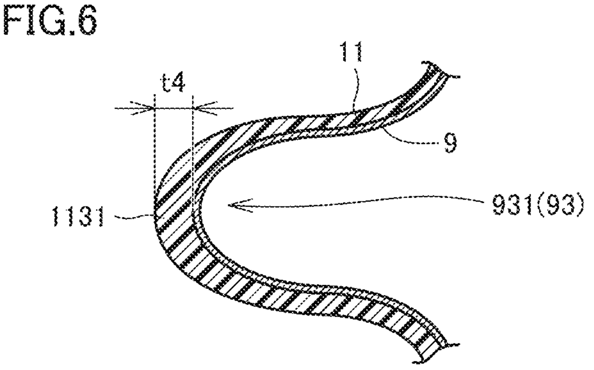
FIG. 6 is a schematic partial sectional view illustrating a bellows member in the circuit breaker of FIG. 5.
Figure 7:
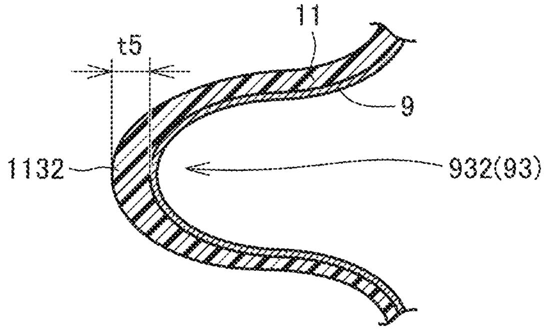
FIG. 7 is a schematic partial sectional view illustrating the bellows member in the circuit breaker of FIG. 5.
Figure 8:
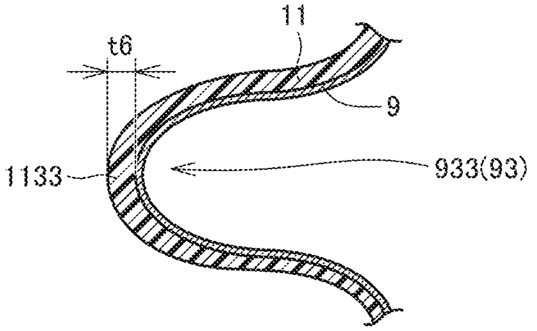
FIG. 8 is a schematic partial sectional view illustrating the bellows member in the circuit breaker of FIG. 5.

FIG. 5 is a schematic sectional view illustrating a circuit breaker according to a second embodiment. FIGS. 6 to 8 are schematic partial sectional views illustrating the bellows member in the circuit breaker of FIG. 5. The circuit breaker in FIGS. 5 to 8 basically has a configuration similar to that of the circuit breaker in FIGS. 1 to 4, but the configuration of resin layer 11 is different from that of the circuit breaker in FIGS. 1 to 4. That is, in the circuit breaker of FIGS. 5 to 8, the thicknesses (a fourth thickness t4 and a fifth thickness t5) of resin layer 11 connected to a first intermediate recess 931 and a second intermediate recess 932, which are the second valley from the end of bellows member 9, are greater than the thicknesses of resin layer 11 connected to the plurality of recesses (a third intermediate recess 933) located at and after the third valley from the end of bellows member 9. The details will be described below.

In the circuit breaker of FIGS. 5 to 8, the plurality of intermediate recesses 93 include first intermediate recess 931, second intermediate recess 932, and a plurality of third intermediate recesses 933. First intermediate recess 931 is closest to first recess 91. That is, first intermediate recess 931 is the recess of the second valley from first end 9*a* of bellows member 9. Second intermediate recess 932 is closest to second recess 92. That is, second intermediate recess 932 is the recess of the second valley from second end 9*b* of bellows member 9.

The plurality of third intermediate recesses 933 are disposed between first intermediate recess 931 and second intermediate recess 932. The number of the plurality of third intermediate recesses 933 is 4 in FIG. 5. The number of the third intermediate recesses 933 may be greater than or equal to 5 and less than or equal to 3.

Third part 113 of resin layer 11 includes a first intermediate part 1131, a second intermediate part 1132, and a third intermediate part 1133. First intermediate part 1131 is connected to the inner peripheral side of first intermediate recess 931. First intermediate part 1131 has fourth thickness t4. Second intermediate part 1132 is connected to the inner peripheral side of second intermediate recess 932. Second intermediate part 1132 has fifth thickness t5. Third intermediate part 1133 is connected to the inner peripheral side of the plurality of third intermediate recesses 933. Each of the plurality of third intermediate parts 1133 has a sixth thickness t6. Fourth thickness t4 and fifth thickness t5 are greater than sixth thickness t6.

Fourth thickness t4 and fifth thickness t5 may be the same as or different from each other. For example, fourth thickness t4 may be greater than fifth thickness t5. Alternatively, fifth thickness t5 may be greater than fourth thickness t4. Sixth thicknesses t6 of the plurality of third intermediate parts 1133 may be the same as or different from each other. The recess in which third intermediate part 1133 is not formed may exist in the plurality of third intermediate recesses 933.

Advantageous Effect

In the circuit breaker, the plurality of intermediate recesses 93 may include first intermediate recess 931, second intermediate recess 932, and the plurality of third intermediate recesses 933. First intermediate recess 931 may be closest to first recess 91. Second intermediate recess 932 may be closest to second recess 92. The plurality of third intermediate recesses 933 may be disposed between first intermediate recess 931 and second intermediate recess 932. Third part 113 of resin layer 11 includes a first intermediate part 1131, a second intermediate part 1132, and a third intermediate part 1133. First intermediate part 1131 may be connected to first intermediate recess 931 and have fourth thickness t4. Second intermediate part 1132 may be connected to second intermediate recess 932 and have fifth thickness t5. Third intermediate part 1133 may be connected to at least one of the plurality of third intermediate recesses

933 and have sixth thickness t6. Fourth thickness t4 and fifth thickness t5 may be greater than sixth thickness t6.

At this point, in first intermediate recess 931 and second intermediate recess 932, there is a possibility that the amount of generated distortion becomes greater than or equal to that of first recess 91 and second recess 92 due to superimposition of reflected waves at first connection portion 1*a* and second connection portion 10*a* as fixed ends and input waves incident from the central portion side of bellows member 9. As described above, the thickness (fourth thickness t4 and fifth thickness t5) of resin layer 11 at the portion where the distortion amount may be large is made sufficiently thick, so that the transient vibration of bellows member 9 can be effectively attenuated. As a result, the fatigue life of bellows member 9 can be extended.

In the circuit breaker, third intermediate part 1133 may be connected to all of the plurality of third intermediate recesses 933. In this case, the transient vibration of bellows member 9 can be more effectively attenuated.

Third Embodiment

<Configuration of Circuit Breaker>

Figure 9:
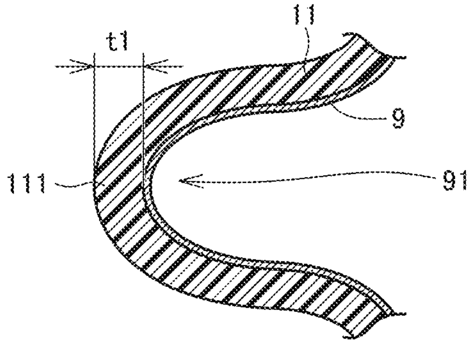
FIG. 9 is a schematic partial sectional view illustrating a bellows member in a circuit breaker according to a third embodiment.
Figure 10:
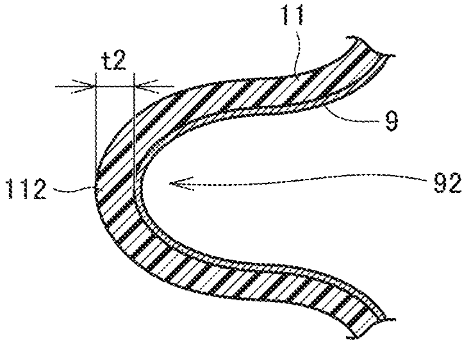
FIG. 10 is a schematic partial sectional view illustrating the bellows member in the circuit breaker of the third embodiment.

FIGS. 9 and 10 are schematic partial sectional views illustrating bellows member 9 in a circuit breaker according to a third embodiment. The circuit breaker in FIGS. 9 and 10 basically has a configuration similar to that of the circuit breaker in FIGS. 1 to 4, but the configuration of resin layer 11 is different from that of the circuit breaker in FIGS. 1 to 4. That is, in the circuit breaker of FIGS. 9 and 10, the thickness (second thickness t2) of resin layer 11 connected to second recess 92 that is the first valley from the end of bellows member 9 on the side of end plate 10 is smaller than the thickness (first thickness t1) of resin layer 11 connected to first recess 91 that is the first valley from the end of bellows member 9 on the side of lower flange 3.

Advantageous Effect

In the circuit breaker, second thickness t2 may be thinner than first thickness t1. At this point, in bellows member 9, the amount of strain generated on the side of second recess 92 is smaller than the amount of strain generated on the side of first recess 91. This is because of the following reasons. That is, during the opening operation of the circuit breaker, end plate 10 moves together with movable shaft 7. As a result, an instantaneous displacement load is input to second end 9*b* of bellows member 9. As a result, in bellows member 9, the compressional wave of the displacement propagates from the side of second end 9*b* toward the side of first end 9*a*. The compressional wave is reflected by first end 9*a* connected to lower flange 3 to change the traveling direction. The compressional wave reflected by first end 9*a* propagate from first end 9*a* toward second end 9*b*. Because the compressional wave passes through first end 9*a* when the compressional wave is reflected by second end 9*b*, the compressional wave (transient vibration) is attenuated to some extent by plastic deformation of bellows member 9, viscoelastic deformation of resin layer 11, and friction of the filler when resin layer 11 contains the filler. For this reason, in bellows member 9, the amount of strain on the side of second end 9*b* tends to be smaller than the amount of strain on the side of first end 9*a*.

Thus, when second thickness t2 that is the thickness of resin layer 11 in the second recess 92 is made thinner than first thickness t1 that is the thickness of resin layer 11 in first recess 91, a damping effect can be exhibited while the increase in the mass of the entire assembly (bellows portion) of bellows member 9 and resin layer 11 is prevented. As a result, the fatigue life of bellows member 9 can be extended.

Fourth Embodiment

<Configuration of Circuit Breaker>

Figure 11:
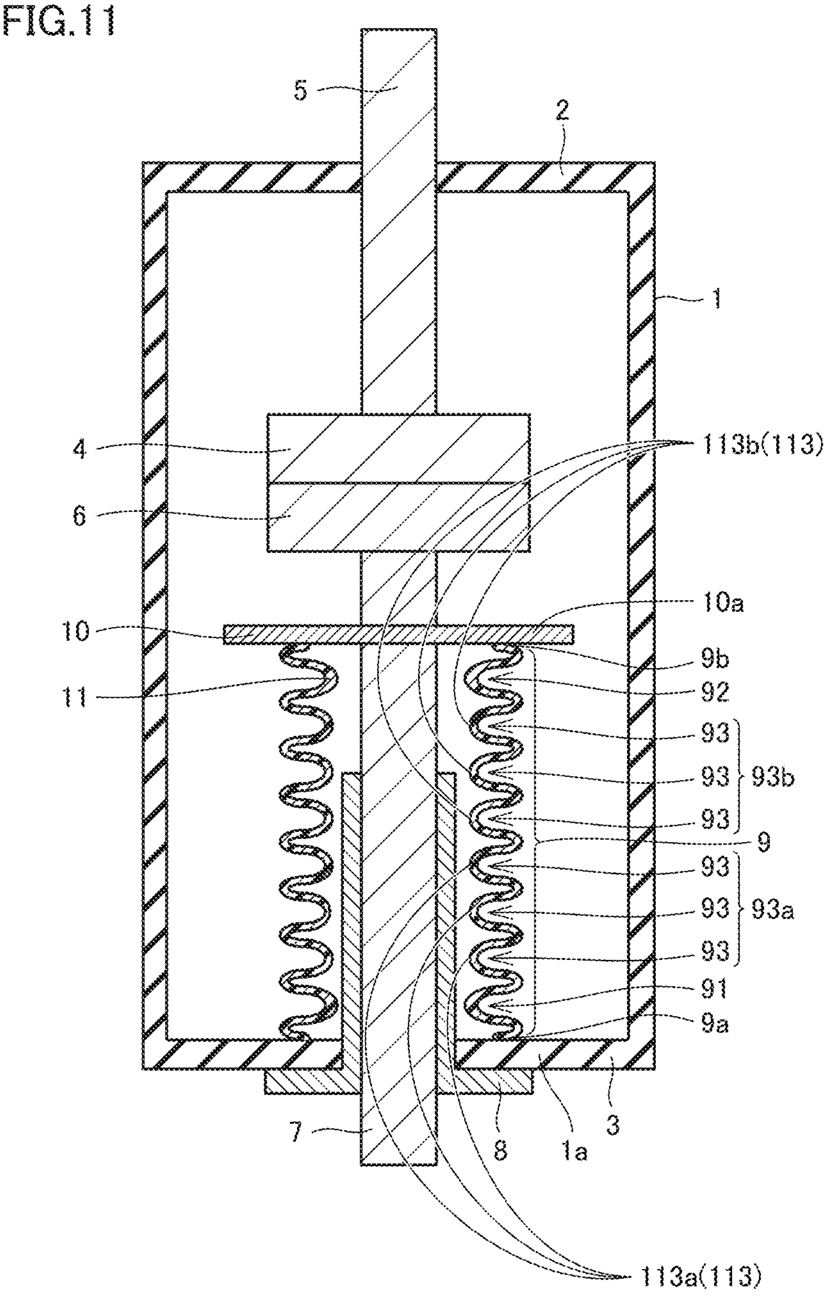
FIG. 11 is a schematic sectional view illustrating a circuit breaker according to a fourth embodiment.
Figure 12:
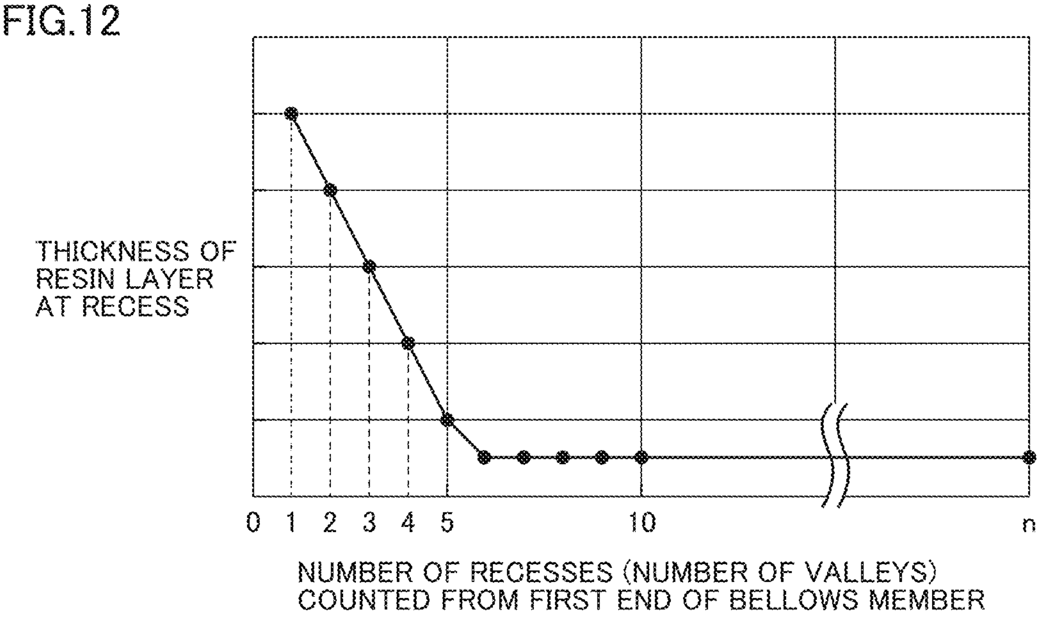
FIG. 12 is a graph illustrating a relationship between a thickness of a resin layer of the bellows member and a recess in an uneven portion in the circuit breaker of the fourth embodiment.

FIG. 11 is a schematic sectional view illustrating a circuit breaker according to a fourth embodiment. FIG. 12 is a graph illustrating a relationship between a thickness of resin layer 11 of bellows member 9 and the recess in the uneven portion in the circuit breaker of the fourth embodiment. The circuit breaker in FIGS. 11 and 12 basically has a configuration similar to that of the circuit breaker in FIGS. 1 to 4, but the configuration of resin layer 11 is different from that of the circuit breaker in FIGS. 1 to 4. That is, in the circuit breaker of FIGS. 11 and 12, the thickness of resin layer 11 gradually decreases from the end (first end 9*a* and second end 9*b*) of bellows member 9 toward the central portion in the extending direction of bellows member 9.

From a different point of view, in the circuit breaker of FIGS. 11 and 12, the plurality of intermediate recesses 93 includes a first intermediate recess group 93*a* and a second intermediate recess group 93*b*. First intermediate recess group 93*a* is located at the end on the side of first recess 91. First intermediate recess group 93*a* includes three intermediate recesses 93 arranged along the extending direction of movable shaft 7. Second intermediate recess group 93*b* is located at the end on the side of second recess 92. Second intermediate recess group 93*b* includes three intermediate recesses 93 arranged along the extending direction of movable shaft 7. In the circuit breaker of FIG. 11, the plurality of intermediate recesses 93 are configured only by first intermediate recess group 93*a* and second intermediate recess group 93*b*. However, the plurality of intermediate recesses 93 may include one or a plurality of recesses arranged between first intermediate recess group 93*a* and second intermediate recess group 93*b*.

Third part 113 of resin layer 11 includes a first recess-side part 113*a* and a second recess-side part 113*b*. First recess-side part 113*a* is connected to the inner peripheral side of first intermediate recess group 93*a*. Second recess-side part 113*b* is connected to the inner peripheral side of second intermediate recess group 93*b*. As illustrated in FIG. 12, the thickness of first recess-side part 113*a* gradually decreases as the distance from first recess 91 increases.

In FIG. 12, a vertical axis represents the thickness of resin layer 11 (the thickness of first part 111 and first recess-side part 113*a*), and a horizontal axis represents the number of recesses (the number of valleys) counted from first end 9*a* of bellows member 9. 1 on the horizontal axis represents first recess 91. 2 on the horizontal axis indicates intermediate recess 93 closest to first end 9*a* of first intermediate recess group 93*a*. 3 on the horizontal axis indicates second intermediate recess 93 from the side of first end 9*a* in first intermediate recess group 93*a*. 4 on the horizontal axis indicates third intermediate recess 93 in first intermediate recess group 93*a*. FIG. 12 illustrates a graph when a plurality of recesses are disposed between first intermediate recess group 93*a* and second intermediate recess group 93*b*. In the configuration of the circuit breaker in FIG. 12, the thickness of resin layer 11 gradually decreases in the portion connected to the sixth recess from the side of first end 9*a*. The thickness of the portion of resin layer 11 connected to the sixth and subsequent recesses from the side of first end 9*a* is substantially constant as illustrated in FIG. 12. Similarly to first recess-side part 113*a*, the thickness of second recess-side part 113*b* gradually decreases as second recess-side part 113*b* goes away from second recess 92.

Advantageous Effect

In the circuit breaker, the plurality of intermediate recesses 93 may include first intermediate recess group 93*a* and second intermediate recess group 93*b*. First intermediate recess group 93*a* is located at the end on the side of first recess 91. First intermediate recess group 93*a* may include three intermediate recesses 93 arranged along the extending direction of movable shaft 7. Second intermediate recess group 93*b* is located at the end on the side of second recess 92. Second intermediate recess group 93*b* may include three intermediate recesses 93 arranged along the extending direction of movable shaft 7. Third portion 113 of resin layer 11 may include first recess-side part 113*a* and second recess-side part 113*b*. First recess-side part 113*a* may be connected to first intermediate recess group 93*a*. Second recess-side part 113*b* may be connected to second intermediate recess group 93*b*. The thickness of first recess-side part 113*a* may gradually decrease as the distance from first recess 91 increases. The thickness of second recess-side part 113*b* may gradually decrease as second recess-side part 113*b* goes away from second recess 92.

In this case, the thickness of resin layer 11 gradually decreases from the side of first recess 91 or the side of second recess 92 toward the central portion of bellows member 9, so that local concentration of strain in bellows member 9 can be prevented unlike the configuration in which the thickness of resin layer 11 discontinuously changes. Thus, the fatigue life of bellows member 9 can be extended.

Fifth Embodiment

<Configuration and Advantageous Effect of Circuit Breaker>

Figure 13:
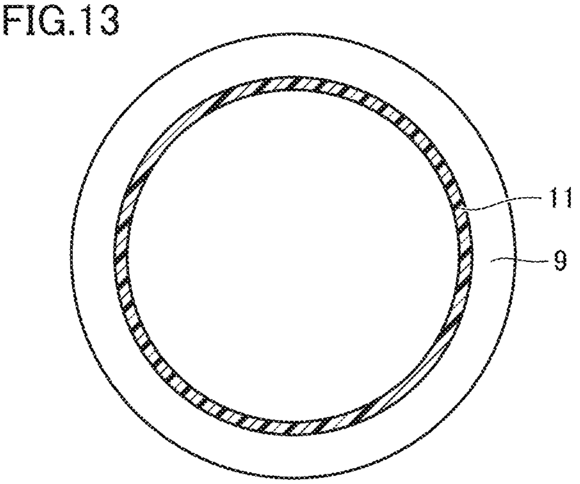
FIG. 13 is a schematic sectional view illustrating a bellows member in a circuit breaker according to a fifth embodiment.

FIG. 13 is a schematic sectional view illustrating a bellows member in a circuit breaker according to a fifth embodiment. The circuit breaker in FIG. 13 basically has a configuration similar to that of the circuit breaker in FIGS. 1 to 4, but the configuration of resin layer 11 is different from that of the circuit breaker in FIGS. 1 to 4. That is, in the circuit breaker of FIG. 13, the thickness of resin layer 11 is uniform in the circumferential direction of bellows member 9.

From a different point of view, in the circuit breaker of FIG. 13, first recess 91 (see FIG. 1), second recess 92 (see FIG. 1), and intermediate recess 93 (see FIG. 1) of bellows member 9 are formed in an annular shape so as to surround movable shaft 7 (see FIG. 1). First part 111 (see FIG. 2), second part 112 (see FIG. 3), and third part 113 (see FIG. 4) are formed so as to extend in the circumferential direction surrounding the periphery of movable shaft 7. First thickness t1, second thickness t2, and third thickness t3 are uniform in the circumferential direction.

Here, when the thickness of resin layer 11 is locally different in the circumferential direction of bellows member 9, the rigidity of the entire bellows portion changes in the circumferential direction. In this case, when the circuit breaker is operated, buckling is likely to be generated at a portion having low rigidity in bellows member 9. In particular, when pressure acts on bellows member 9 by evacuating the inside of container 1 as in the circuit breaker described above, the buckling is likely to be generated.

When the thicknesses (first thickness t1, second thickness t2, third thickness t3) of first part 111, second part 112, and third part 113 of resin layer 11 connected to bellows member 9 are uniform in the circumferential direction as described above, the generation of the buckling as described above can be prevented. At this point, the thickness being uniform in the circumferential direction means that the amount of change in the thickness in the circumferential direction is less than or equal to 10% with respect to the average value in the circumferential direction.

Sixth Embodiment

<Configuration and Advantageous Effect of Circuit Breaker>

Figure 14:
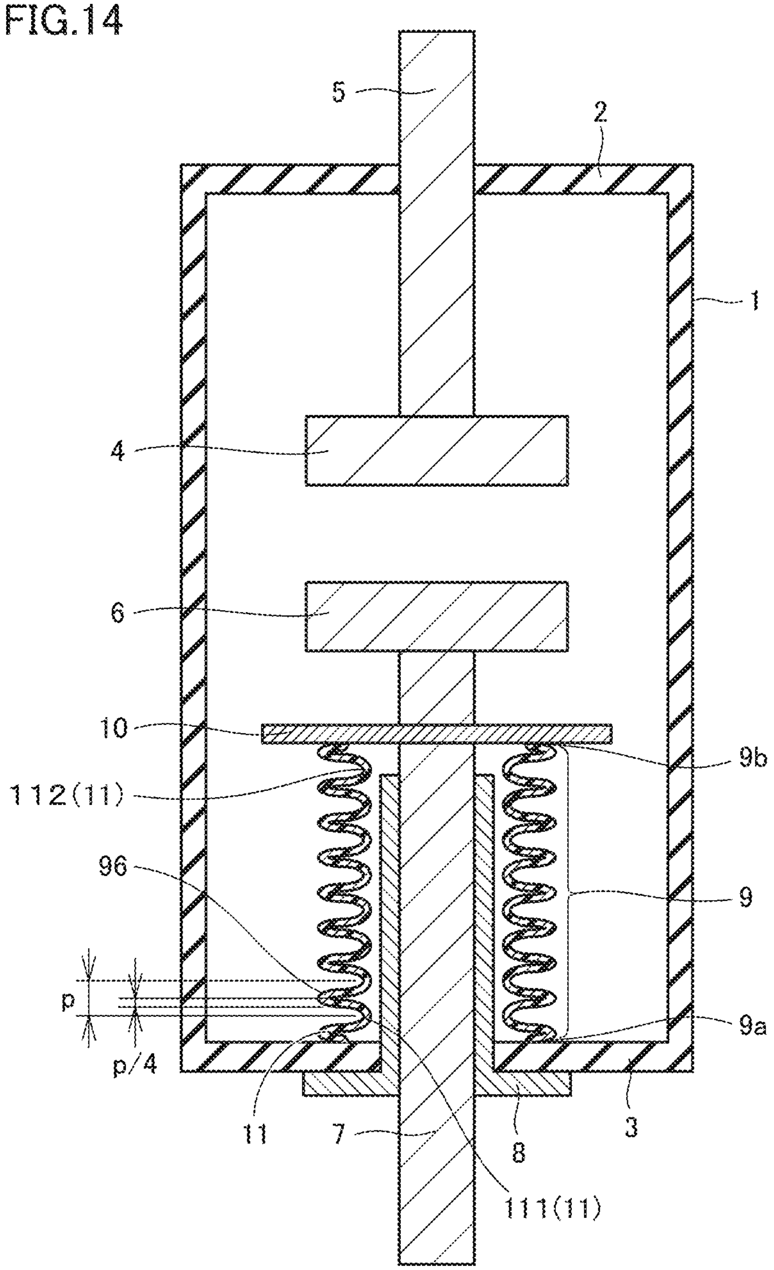
FIG. 14 is a schematic sectional view illustrating a circuit breaker according to a sixth embodiment.

FIG. 14 is a schematic sectional view illustrating a circuit breaker according to a sixth embodiment. FIG. 14 illustrates the state in which movable electrode 6 of the circuit breaker is disposed at the second position away from fixed electrode 4. The circuit breaker in FIG. 14 basically has a configuration similar to that of the circuit breaker in FIGS. 1 to 4, but the configuration of resin layer 11 is different from that of the circuit breaker in FIGS. 1 to 4. That is, in the circuit breaker of FIG. 14, the range of the thickness of resin layer 11 is determined based on the thickness of bellows member 9 and a pitch p of the uneven portion. Specifically, first thickness t1 (see FIG. 2) of first part 111 and second thickness t2 (see FIG. 3) of second part 112 in resin layer 11 are greater than or equal to 0.5 times the thickness of the uneven portion of bellows member 9. First thickness t1 and second thickness t2 are less than or equal to 0.25 times pitch p of the plurality of uneven portions in the state where movable electrode 6 is disposed at the second position as illustrated in FIG. 14.

In this case, because resin layer 11 has a sufficient thickness by defining the lower limits of first thickness t1 and second thickness t2 of resin layer 11, the damping effect on bellows member 9 can be reliably obtained. In addition, when movable electrode 6 is disposed at the second position, bellows member 9 is in the most compressed state. However, when the upper limits of first thickness t1 and second thickness t2 of resin layer 11 are defined as described above, adjacent portions of resin layer 11 can be prevented from coming into contact with each other even when bellows member 9 is in the most compressed state. As a result, bellows member 9 can be prevented from being excessively distorted due to contact between adjacent portions of resin layer 11. Thus, the fatigue life of bellows member 9 can be extended.

Seventh Embodiment

<Configuration and Advantageous Effect of Circuit Breaker>

Figure 15:
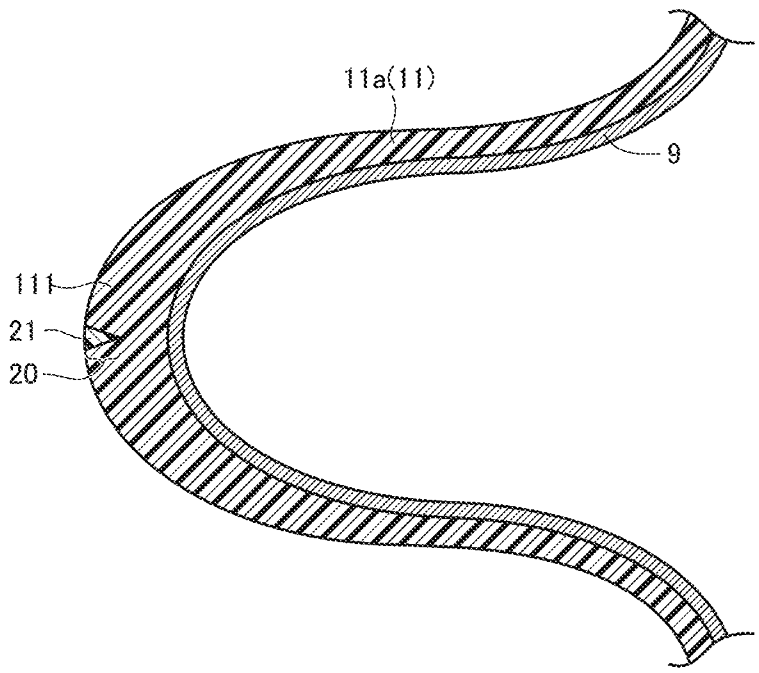
FIG. 15 is a schematic partial sectional view illustrating a bellows member in a circuit breaker according to a seventh embodiment.

FIG. 15 is a schematic partial sectional view illustrating a bellows member in a circuit breaker according to a seventh embodiment. FIG. 15 corresponds to FIGS. 2 to 4. FIG. 15 illustrates the state in which a minute crack 20 is generated in first part 111 of resin layer 11. The circuit breaker in FIG. 15 basically has a configuration similar to that of the circuit breaker in FIGS. 1 to 4, but the configuration of resin layer 11 is different from that of the circuit breaker in FIGS. 1 to 4. That is, in the circuit breaker of FIG. 15, resin layer 11 is a self-repairing resin layer 11*a* containing a self-repairing material. At this point, the self-repairing material means a material that is repaired by itself or is repaired by a simple treatment when breakage such as crack 20 is generated. In FIG. 15, crack 20 is filled by a repair 21 due to the self-repairing material. For example, rubber (for example, bromobutyl rubber) into which ionic crosslinking exhibiting reversible binding is introduced can be used as the self-repairing material. A resin layer in which fine capsules containing a self-repairing material are dispersed may be used as self-repairing resin layer 11*a*. In this case, when crack 20 is generated in self-repairing resin layer 11*a*, the self-repairing material in the capsule exposed at crack 20 may react by air or an external stimulus such as stress at the time of generation of the crack to fill the crack.

In this case, when minute crack 20 is generated in resin layer 11, crack 20 is repaired by the self-repairing material. Accordingly, the growth of crack 20 in resin layer 11 is delayed, and the damping effect by resin layer 11 can be maintained for a long time. Thus, the fatigue life of bellows member 9 can be extended.

Eighth Embodiment

<Configuration and Advantageous Effect of Circuit Breaker>

Figure 16:
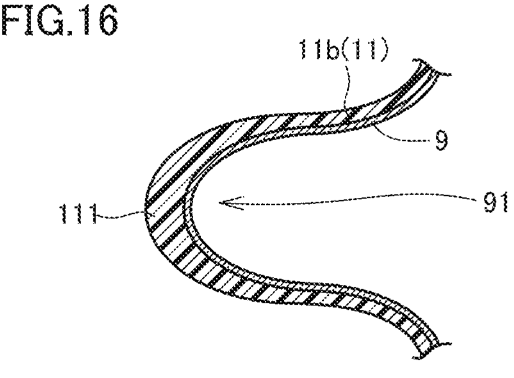
FIG. 16 is a schematic partial sectional view illustrating a bellows member in a circuit breaker according to an eighth embodiment.

FIG. 16 is a schematic partial sectional view illustrating a bellows member in a circuit breaker according to an eighth embodiment. FIG. 16 corresponds to FIG. 2. The circuit breaker in FIG. 16 basically has a configuration similar to that of the circuit breaker in FIGS. 1 to 4, but the configuration of resin layer 11 is different from that of the circuit breaker in FIGS. 1 to 4. That is, in the circuit breaker of FIG. 16, a light-emitting resin layer 11*b* containing a stress-induced illuminant is used as resin layer 11. At this point, the stress-induced illuminant means a material capable of emitting excitation energy as light by mechanical stimulation from the outside in the state of being excited by an electric field or the like. Examples of the mechanical stimulation include impact, compression, tension, or torsion. For example, strontium aluminate that is doped with eurobium and structurally controlled can be used as the stress-induced illuminant.

The stress-induced illuminant included in light-emitting resin layer 11*b* is excited by the electric field caused by current flowing through the circuit breaker in the closed state of the circuit breaker. During the opening operation of the circuit breaker, the impact caused by the movement of movable shaft 7 is applied to bellows member 9, so that bellows member 9 vibrates. The vibration energy of bellows member 9 is converted into the thermal energy in light-emitting resin layer 11*b* as resin layer 11. Furthermore, when the stress-induced illuminant emits light by the vibration of bellows member 9, the vibration energy is also converted into light energy.

As described above, the vibration energy generated during the opening operation of the circuit breaker can be converted into not only the thermal energy but also the light energy in light-emitting resin layer 11*b* as resin layer 11. Thus, the damping effect by resin layer 11 can be increased.

Ninth Embodiment

<Configuration of Circuit Breaker>

Figure 17:
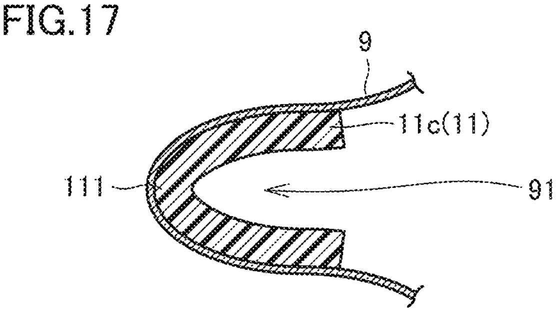
FIG. 17 is a schematic partial sectional view illustrating a bellows member in a circuit breaker according to a ninth embodiment.
Figure 18:
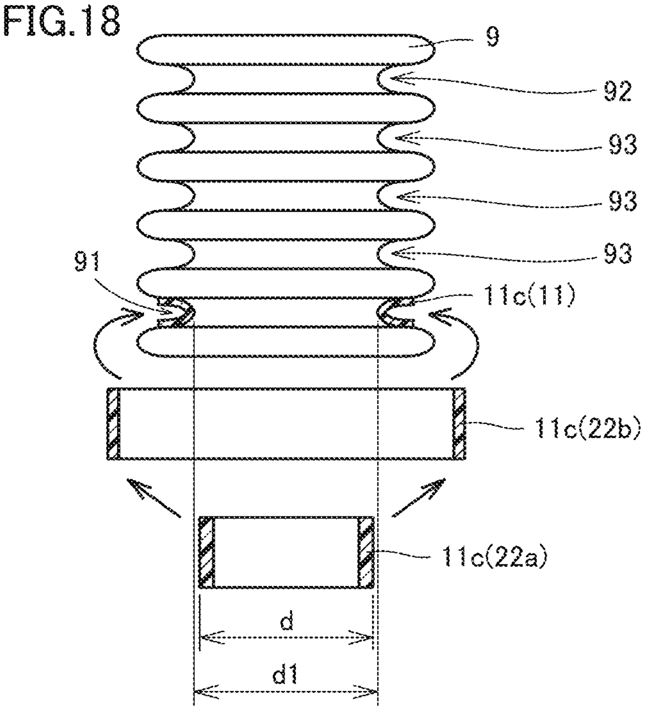
FIG. 18 is a schematic diagram illustrating a method for manufacturing the bellows member in the circuit breaker of FIG. 17.

FIG. 17 is a schematic partial sectional view illustrating a bellows member in a circuit breaker according to a ninth embodiment. FIG. 17 corresponds to FIG. 2. FIG. 18 is a schematic diagram illustrating a method for manufacturing the bellows member in the circuit breaker in FIG. 17. The circuit breaker in FIGS. 17 and 18 basically has a configuration similar to that of the circuit breaker in FIGS. 1 to 4, but the configuration of resin layer 11 is different from that of the circuit breaker in FIGS. 1 to 4. That is, in the circuit breaker of FIGS. 17 and 18, first part 111 of resin layer 11 is installed on the outer peripheral side of first recess 91 in bellows member 9. As can be seen from FIG. 18, first part 111 is an annular resin member 11*c* having annular elasticity. First part 111 is in contact with the outer peripheral side of first recess 91 in the elastically deformed state. Resin layer 11 is similarly disposed on the outer peripheral side of second recess 92 (see FIG. 3) (not illustrated) of bellows member 9. Resin layer 11 provided on the outer peripheral side of second recess 92 may also be an annular resin member having elasticity similarly to first part 111 in FIG. 17.

As a method for forming resin layer 11 in the circuit breaker of FIG. 17, the following method can be used. That is, as illustrated in FIG. 18, first, annular resin member 11*c* that should become first part 111 of resin layer 11 is prepared as a raw material 22*a*. Annular resin member 11*c* as raw material 22*a* has a diameter d in an unloaded state. Diameter d is smaller than an outer diameter d1 of first recess 91 of bellows member 9.

Subsequently, stress is applied to annular resin member 11*c* as raw material 22*a* so as to widen the inner diameter, and an intermediate raw material 22*b* is obtained. At this point, annular resin member 11*c* is in the elastically deformed state. The inner diameter of intermediate raw material 22*b* is greater than the outer diameter of bellows member 9 as illustrated in FIG. 18. When the stress on annular resin member 11*c* as intermediate raw material 22*b* is released, the inner diameter of annular resin member 11*c* decreases.

Intermediate raw material 22*b* described above is disposed at the position surrounding first recess 91 of bellows member 9, and the stress applied to the intermediate raw material 22*b* is released. As a result, as illustrated in FIG. 18, annular resin member 11*c* is installed on the outer periphery of first recess 91 in the elastically deformed state. As described above, because diameter d of annular resin member 11*c* in the unloaded state is smaller than outer diameter d1 of first recess 91, annular resin member 11*c* as resin layer 11 installed on the outer periphery of first recess 91 is in the elastically deformed state (the state in which annular resin member 11*c* is pressed against first recess 91). Thus, resin layer 11 is reliably fixed to the outer periphery of first recess 91.

As described above, annular resin member 11*c* may be installed on the outer periphery of second recess 92 of bellows member 9 to form second part 112 (see FIG. 3). Furthermore, an annular resin member thinner than annular resin member 11*c* illustrated in FIGS. 17 and 18 may be installed on the outer periphery of intermediate recess 93 to form third part 113 (see FIG. 4). In bellows member 9, resin layer 11 made of annular resin member 11*c* may be provided only in first recess 91 and second recess 92. Alternatively, resin layer 11 may be provided only in one of first recess 91 and second recess 92. Resin layer 11 made of an annular resin member may be provided in all of the plurality of intermediate recesses 93. Alternatively, resin layer 11 made of the annular resin member may be provided only on the outer periphery of a part of the plurality of intermediate recesses 93.

Advantageous Effect

In the circuit breaker, at least one of first part 111 and second part 112 (see FIG. 3) may be in contact with first recess 91 or second recess 92 in the elastically deformed state from the outer peripheral side of bellows member 9.

In this case, for example, first part 111 or second part 112 of resin layer 11 made of the annular resin member is deformed (the diameter is increased) to be easily installed in first recess 91 or second recess 92 of bellows member 9. As a result, bellows member 9 and the circuit breaker having the extended fatigue life at low cost can be obtained without introducing special equipment forming the above structure.

It should be considered that the disclosed embodiments are an example in all respects and not restrictive. As long as there is no contradiction, at least two of the disclosed embodiments may be combined. The basic scope of the present disclosure is defined by not the above description but the claims, and it is intended that all modifications within the meaning and scope of the claims are included in the present invention.

REFERENCE SIGNS LIST

1: container, 1*a*: first connection portion, 2: upper flange, 3: lower flange, 4: fixed electrode, 5: fixed shaft, 6: movable electrode, 7: movable shaft, 8: guide member, 9: bellows member, 9*a*: first end, 9*b*: second end, 10: end plate, 10*a*: second connection portion, 11: resin layer, 11*a*: self-repairing resin layer, 11*b*: light-emitting resin layer, 11*c*: annular resin member, 20: crack, 21: repair portion, 22*a*: raw material, 22*b*: intermediate raw material, 91: first recess, 92: second recess, 93: intermediate recess, 93*a*: first intermediate recess group, 93*b*: second intermediate recess group, 111: first part, 112: second part, 113: third part, 113*a*: first recess-side part, 113*b*: second recess-side part, 931: first intermediate recess, 932: second intermediate recess, 933: third intermediate recess, 1131: first intermediate part, 1132: second intermediate part, 1133: third intermediate part, d: diameter, d1: outer diameter, p: pitch, t1: first thickness, t2: second thickness, t3: third thickness, t4: fourth thickness, t5: fifth thickness, t6: sixth thickness

The invention claimed is:

1. A circuit breaker comprising:
a fixed electrode;
a movable electrode movable between a first position in contact with the fixed electrode and a second position away from the fixed electrode;
a container to hold the fixed electrode and the movable electrode inside; and
a movable shaft extending from an outside to an inside of the container and connected to the movable electrode,
wherein the movable shaft moves the movable electrode between the first position and the second position by moving along an extending direction of the movable shaft;
a bellows member that is disposed so as to surround a periphery of the movable shaft, includes a plurality of uneven portions, and connects the movable shaft and the container; and
a resin layer connected to the plurality of uneven portions of the bellows member, wherein
the container includes a first connection portion to which a first end of the bellows member is connected,
the movable shaft includes a second connection portion to which a second end located on a side opposite to the first end of the bellows member is connected,
the plurality of uneven portions include:
a first recess closest to the first connection portion;
a second recess closest to the second connection portion; and
a plurality of intermediate recesses disposed between the first recess and the second recess,
the resin layer includes:
a first part that is connected to the first recess and has a first thickness;
a second part that is connected to the second recess and has a second thickness; and
a third part that is connected to at least one of the plurality of intermediate recesses and has a third thickness, and
the third thickness is thinner than the first thickness and the second thickness,
the plurality of intermediate recesses include:
a first intermediate recess closest to the first recess;
a second intermediate recess closest to the second recess; and
a plurality of third intermediate recesses disposed between the first intermediate recess and the second intermediate recess,
the third part of the resin layer includes:
a first intermediate part that is connected to the first intermediate recess and has a fourth thickness;
a second intermediate part that is connected to the second intermediate recess and has a fifth thickness; and
a third intermediate part that is connected to at least one of the plurality of third intermediate recesses and has a sixth thickness, and
the fourth thickness and the fifth thickness are thicker than the sixth thickness.

2. The circuit breaker according to claim 1, wherein the third part is connected to all of the plurality of intermediate recesses.

3. The circuit breaker according to claim 1, wherein the second thickness is thinner than the first thickness.

4. The circuit breaker according to claim 1, wherein
the plurality of intermediate recesses include:
a first intermediate recess group that is located at an end on a first recess side and includes three intermediate recesses arranged along the extending direction of the movable shaft; and
a second intermediate recess group that is located at an end on the second recess side and includes three intermediate recesses arranged along the extending direction of the movable shaft,
the third part of the resin layer includes:
a first recess-side part connected to the first intermediate recess group; and
a second recess-side part connected to the second intermediate recess group,
a thickness of the first recess-side part gradually decreases as the first recess-side part is away from the first recess, and
a thickness of the second recess-side part gradually decreases as the second recess-side part is away from the second recess.

5. The circuit breaker according to claim 1, wherein
each of the first recess, the second recess, and the plurality of intermediate recesses is formed in an annular shape so as to surround a periphery of the movable shaft,
each of the first part, the second part, and the third part is formed so as to extend in a circumferential direction surrounding the periphery of the movable shaft, and
the first thickness, the second thickness, and the third thickness are uniform in the circumferential direction.

6. The circuit breaker according to claim 1, wherein the first thickness and the second thickness are greater than or equal to 0.5 times a thickness of the plurality of uneven portions of the bellows member and less than or equal to 0.25 times a pitch of the plurality of uneven portions while the movable electrode is disposed at the second position.

7. The circuit breaker according to claim 1, wherein the resin layer includes a self-repairing material.

8. The circuit breaker according to claim 1, wherein the resin layer includes a stress-induced illuminant.

9. The circuit breaker according to claim 1, wherein at least one of the first part and the second part is in contact with the first recess or the second recess in an elastically deformed state from an outer peripheral side of the bellows member.

* * * * *